(12) United States Patent
Mizrahi

(10) Patent No.: US 8,978,009 B2
(45) Date of Patent: Mar. 10, 2015

(54) DISCOVERING WHETHER NEW CODE IS COVERED BY TESTS

(75) Inventor: Saggi Yehuda Mizrahi, Fierberg (IL)

(73) Assignee: Red Hat Israel, Ltd., Raanana (IL)

( * ) Notice: Subject to any disclaimer, the term of this patent is extended or adjusted under 35 U.S.C. 154(b) by 78 days.

(21) Appl. No.: 13/267,499

(22) Filed: Oct. 6, 2011

(65) Prior Publication Data

US 2013/0091490 A1 Apr. 11, 2013

(51) Int. Cl.
*G06F 9/44* (2006.01)
*G06F 11/36* (2006.01)

(52) U.S. Cl.
CPC .......... *G06F 11/368* (2013.01); *G06F 11/3672* (2013.01); *G06F 11/3692* (2013.01); *G06F 11/3676* (2013.01)
USPC .......................................... 717/122; 717/124

(58) Field of Classification Search
CPC ............... G06F 8/30; G06F 8/36; G06F 8/66; G06F 8/71; G06F 9/44521; G06F 11/36; G06F 11/362; G06F 11/3664; G06F 11/3668; G06F 11/3672; G06F 11/3688
USPC ......................................................... 717/122
See application file for complete search history.

(56) References Cited

U.S. PATENT DOCUMENTS

| | | | |
|---|---|---|---|
| 5,590,329 A | 12/1996 | Goodnow et al. | |
| 5,673,387 A * | 9/1997 | Chen et al. | 714/38.1 |
| 5,758,163 A | 5/1998 | Safonov | |
| 5,805,795 A * | 9/1998 | Whitten | 714/38.1 |
| 5,860,011 A | 1/1999 | Kolawa et al. | |
| 7,028,290 B2 * | 4/2006 | Srivastava et al. | 717/124 |
| 7,165,072 B2 | 1/2007 | Feng et al. | |
| 7,210,138 B2 | 4/2007 | Zatloukal et al. | |
| 7,503,037 B2 * | 3/2009 | Banerjee et al. | 717/124 |
| 7,617,484 B1 | 11/2009 | Fienblit et al. | |
| 8,079,018 B2 | 12/2011 | Huene et al. | |
| 8,266,592 B2 | 9/2012 | Beto et al. | |
| 8,276,123 B1 * | 9/2012 | Deng et al. | 717/125 |
| 8,381,184 B2 * | 2/2013 | Johnson et al. | 717/124 |

(Continued)

FOREIGN PATENT DOCUMENTS

EP 2333669 B1 9/2012

OTHER PUBLICATIONS

Benedusi, P.; Cmitile, A.; De Carlini, U., "Post-maintenance testing based on path change analysis," Software Maintenance, 1988., Proceedings of the Conference on, pp. 352-361, Oct. 24-27, 1988.*

(Continued)

*Primary Examiner* — Wei Zhen
*Assistant Examiner* — Andrew M Lyons
(74) *Attorney, Agent, or Firm* — Lowenstein Sandler LLP

(57) ABSTRACT

A computing device obtains a delta between a first version of a target program and a second version of the target program that has been tested by one or more test routines. The computing device identifies a first portion of the second version of the target program that has not been tested in the first version of the target program and a second portion of the second version of the target program that has been tested in the first version of the target program based on the delta. The computing device executes the one or more test routines on at least the first portion of the second version of the target program without executing the one or more test routines on the second portion of the second version of the target program.

15 Claims, 8 Drawing Sheets

(56) References Cited

U.S. PATENT DOCUMENTS

| | | |
|---|---|---|
| 8,539,282 B1 | 9/2013 | Kabanov et al. |
| 2005/0044533 A1 | 2/2005 | Nesbit et al. |
| 2006/0009962 A1 | 1/2006 | Monk |
| 2008/0126867 A1 | 5/2008 | Pandarinathan et al. |
| 2008/0313616 A1 | 12/2008 | Malcolm |
| 2012/0260132 A1 | 10/2012 | Blue et al. |
| 2013/0091492 A1 | 4/2013 | Mizrahi |

OTHER PUBLICATIONS

Danus "Java Source Code Analysis Tool," Dec. 2002.

Xu et al., Automatic Diagnosis of Student Programs in Programming Lewarning Environments:, 1999, pp. 1102-1107.

Horwitz, "Identifying the Semantic and Textual Differences Between Two Versions of a Program", 1990, pp. 234-245.

Yang, "Identifying Syntactic Differences Between Two Programs", 1991, pp. 739-755.

USPTO; Office Action for U.S. Appl. No. 13/267,506, mailed Apr. 3, 2013.

USPTO; Office Action for U.S. Appl. No. 13/267,506, mailed Oct. 11, 2013.

Hagai Cibulski, Amiram Yehudai, "Regression Test Selection Techniques for Test-Driven Development," icstw, pp. 115-124, 2011 IEEE Fourth International Conference on Software Testing, Cerification and Validation Workshops, 2011.

Rothermel, Gregg and Harrold, Mary Jean, "Analyzing Regression Test Selection Techniques," (1996), CSE Journal Articles, Paper 13, retrieved from http://digitalcommons.unl.edu/csearticles/13.

Wong et al., "A Study of Effective Regression Testing in Practice," (1997), 8th IEEE International Symposium on Software Reliability Engineering (ISSRE'97), pp. 264-274, retrieved from http://cs.virginia.edu/-jx9n/courses/cs751/issre97.pdf.

USPTO; Office Action for U.S. Appl. No. 13/267,506, mailed Apr. 21, 2014.

Office Action for U.S. Appl. No. 13/267,506 mailed Sep. 10, 2014.

\* cited by examiner

```
diff --git a/vdsm/storage/iscsi.py b/vdsm/storage/iscsi.py          301
index 32e6586..578b3aa 100644
--- a/vdsm/storage/iscsi.py
+++ b/vdsm/storage/iscsi.py
@@ -554,6 +553,0 @@ def _getiSCSISessionList():
-def _safeGethostbyname(host):
-    try:
-        return socket.gethostbyname(host)
-    except socket.gaierror:
-        return host
-
@@ -561,10 +555,3 @@ def sameSession(enta, entb):
-    for k, va in enta.iteritems():
-        if k in ['portal', 'user', 'password']:
-            continue
-        if not va:
-            continue
-        try:
-            vb = entb[k]
-        except KeyError:
+    for k, v in enta.iteritems():
+        vb = entb.get(k, None)
+        if (v and not vb) or (not v and vb):
```

File: vdsm/storage/iscsi.py —— 351

Lines: 554, 555, 556, 557, 558, 559, 560, 561, 562, 563, 564, 565, 566, 567, 568, 569, 570, 571, 572, 575, 576, 577, 579, 581, 582, 583 —— 352

Test: testIscsi —— 401

File: vdsm/storage/iscsi.py —— 402

Lines: 558, 559, 560, 561, 562, 563, 564, 565, 566, 567, 568, 569, 570, 571, 572, 575, 576, 577, 579, 581, 582, 583, 591, 592 —— 403

DISCOVERING WHETHER NEW CODE IS COVERED BY TESTS

RELATED APPLICATIONS

This application is related to co-pending U.S. patent application Ser. No. 13/267,506, entitled "Method to Automate Running Relevant Automatic Tests to Quickly Access Code Stability," filed Oct. 6, 2011, which is incorporated by reference herein.

TECHNICAL FIELD

Embodiments of the present invention relate generally to software testing. More particularly, embodiments of the invention relate to an efficient software testing framework.

BACKGROUND

Software, such as programs or applications, must be tested after each substantial revision to determine if the changes in the new version might have detrimentally affected the operation of the software due to unanticipated conflicts or errors. Software testers utilize a number of testing tools to evaluate the performance of new versions and to identify the source of any problems they may find.

Testing software is a tedious process that must be repeated after each revision. Oftentimes, performance testing starts with a benchmarking test. If the results of the benchmarking test indicate that performance of the software is not as anticipated, then additional software tests are typically performed, this time with one or more testing tools until the source of the problem is identified so that the problem can be corrected.

Each test of the software requires the tester to develop a test scenario in which the tester identifies each testing tool or tools to be used, what data each tool will track, and what operational scenario the software should perform. Typically, for each scenario, a test routine or script is created to specifically test the circumstances surrounding that scenario. There may be multiple test routines for each piece of software code.

During the test, a quality assurance (QA) engineer may discover a bug or bugs and a developer may fix the bug or bugs. As a result, a new version of the software may be generated. Typically, the change between a current version and a previous version of the software, also referred to as a delta, may be minimal. However, such a change may still require another round of testing to make sure that the new code works properly. In a conventional test framework, the entire set of test routines is run even though the delta is relatively small. As a result, some tests are repeatedly performed even though some code has not been changed, which may consume unnecessary time and resources.

BRIEF DESCRIPTION OF THE DRAWINGS

The present invention is illustrated by way of example and not limitation in the figures of the accompanying drawings in which like references indicate similar elements.

FIGS. 3A-3B are diagrams illustrating examples of deltas retrieved from a version control system.

FIG. 4 is a diagram illustrating an example of test coverage data according to one embodiment of the invention.

DETAILED DESCRIPTION

Figure 1:
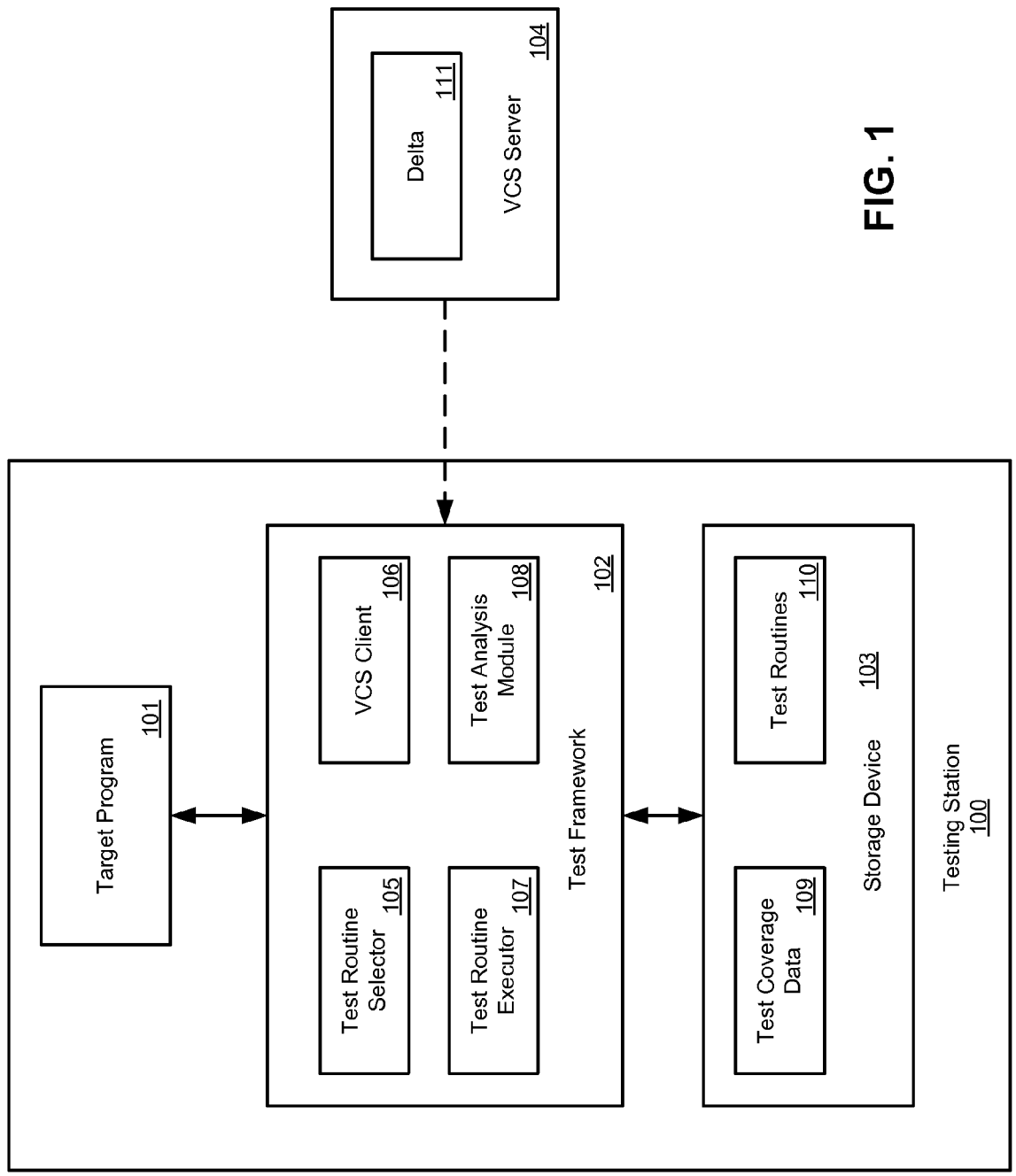
FIG. 1 is a block diagram illustrating a test system according to one embodiment of the invention.

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, test coverage data is generated and maintained for each test routine during a test in which the test routine is executed or run through a target program being tested. The test coverage data identifies lines of code of the target program that have been tested by the test routine during a previous test. Subsequently, when a new version of the target program is to be tested, a delta between the new version and the previous version is obtained to identify which of the lines of code are new and which of the lines of code existed in the previous version. For each test routine, the corresponding test coverage data is examined to identify the lines of code that have been tested previously by the same test routine. As a result, the test routine may only be executed or run on the lines of code that mainly exist in the new version of the target program, without having to retest the lines of code that have already been tested previously. In one embodiment, the delta is obtained via a version control system (VCS) that stores source code of different versions of the target program.

According to one embodiment, in order to quickly assess code stability of a new version of a target program, a test routine is selected from multiple test routines that are scheduled to be run on the new version of the target program. The test routine is selected based on the coverage of the same test routine performed on the previous version of the target program. In one embodiment, a test routine having the highest test coverage for the previous version of the target program is selected to test the new version of the target program. That is, a test routine that tests the most lines of code of the new version of the target program is executed first. Note that a delta received from the VCS system may include new lines of code that are not in a previous version, as well as some lines of code (e.g., adjacent lines of code) that exist in the previous version of the target program. A test routine is selected such that the selected routine covers the most of the existing lines of code. In this way, a tester can quickly assess the stability of the new code because fewer new lines of code (e.g., untested lines of code) need to be tested in this situation. In other words, if the new code fails the selected test routine having the maximum test coverage, there is less incentive to test the remaining test routines.

FIG. 1 is a block diagram illustrating a test system according to one embodiment of the invention. Referring to FIG. 1, testing station 100 includes a target program 101 to be tested by test framework 102 using one or more test routines 110 stored in storage device 103. Target program 101 can be written in a variety of programming languages such as C/C++, Java, etc. In one embodiment, test framework 102 includes test routine selector 105, VCS client 106, test routine executor 107, and test analysis module 108.

In one embodiment, the target program 101 to be tested is a new (current) version of the target program 101. Previous versions of the target program 101 may have already been tested using one or more test routines 110. Those test routines 110 may have tested all or a portion of the target program 101 (e.g., all lines of code or only some lines of code of target program 101). The new version of the target program 101 may have been developed in response to errors (e.g., bugs) being detected by the one or more test routines 110 during previous rounds of testing. The new version of the target program 101 may include new lines of code and/or modified lines of code. The new version of the target program 101 may also lack lines of code that were in previous versions. In one embodiment, a VCS server 104 stores a delta 111 of differences between the new version of the target program 101 and a previous version of the target program 101. This delta 111 may have been generated, for example, by the VCS server 104.

According to one embodiment, when target program 101 is to be tested, test analysis module 108 invokes VCS client 106 to obtain delta 111 from VCS server 104, where delta 111 represents a code difference between a current version of target program 101 and a previous version of target program 101. In one embodiment, when target program 101 is to be tested, test analysis module 108 retrieves test coverage data 109 from storage device 103. Test coverage data 109 includes information identifying lines of code in the previous version of target program 101 that are covered by (have been tested by) the test routine.

Test analysis module 108 is configured to use delta 111 and/or test coverage data 109 to determine which lines of code of the current version of target program 101 to test. In one embodiment, test analysis module 108 determines which lines of code have been tested in a previous test based at least in part on delta 111. In one embodiment, for each test routine 110, test analysis module 108 is configured to identify lines of code that have been previously tested by the corresponding test routine based on test coverage data 109 associated with the test routine 110. Based on this analysis and on delta 111, the lines of code from delta 111 that have not been tested in the previous test cycle and/or that have been modified since they were tested in the previous test cycle are identified. Thereafter, the test routine 110 can be applied to those lines of code that have not been previously tested (e.g., new lines of code or modified lines of code) without having to execute the test routine on all the lines of code that have been previously tested. As a result, the time and resources required to test the target program can be greatly reduced.

In addition, according to one embodiment, test analysis module 108 ranks and/or rates the test routines 110 based on the delta 111 and the associated test coverage data 109 of a previous test cycle. A test routine having the maximum coverage on the current version of target program 101 is selected first by test routine selector 105 to test target program 101 in order to quickly assess the code stability of target program 101. According to one embodiment, test routines 110 are ranked according to their test coverage and test routines 110 are executed by test routine executor 107 according to an order determined based on their ranking. For example, the test routines 110 can be ordered or sorted from the test routine 110 with the highest test coverage to the test routine 110 with the lowest test coverage. That is, a test routine 110 having the highest test coverage (e.g., least untested lines of code) will be run first. The test routine 110 with the highest coverage can quickly provide the initial assessment of the code stability of the new code.

Figure 2:
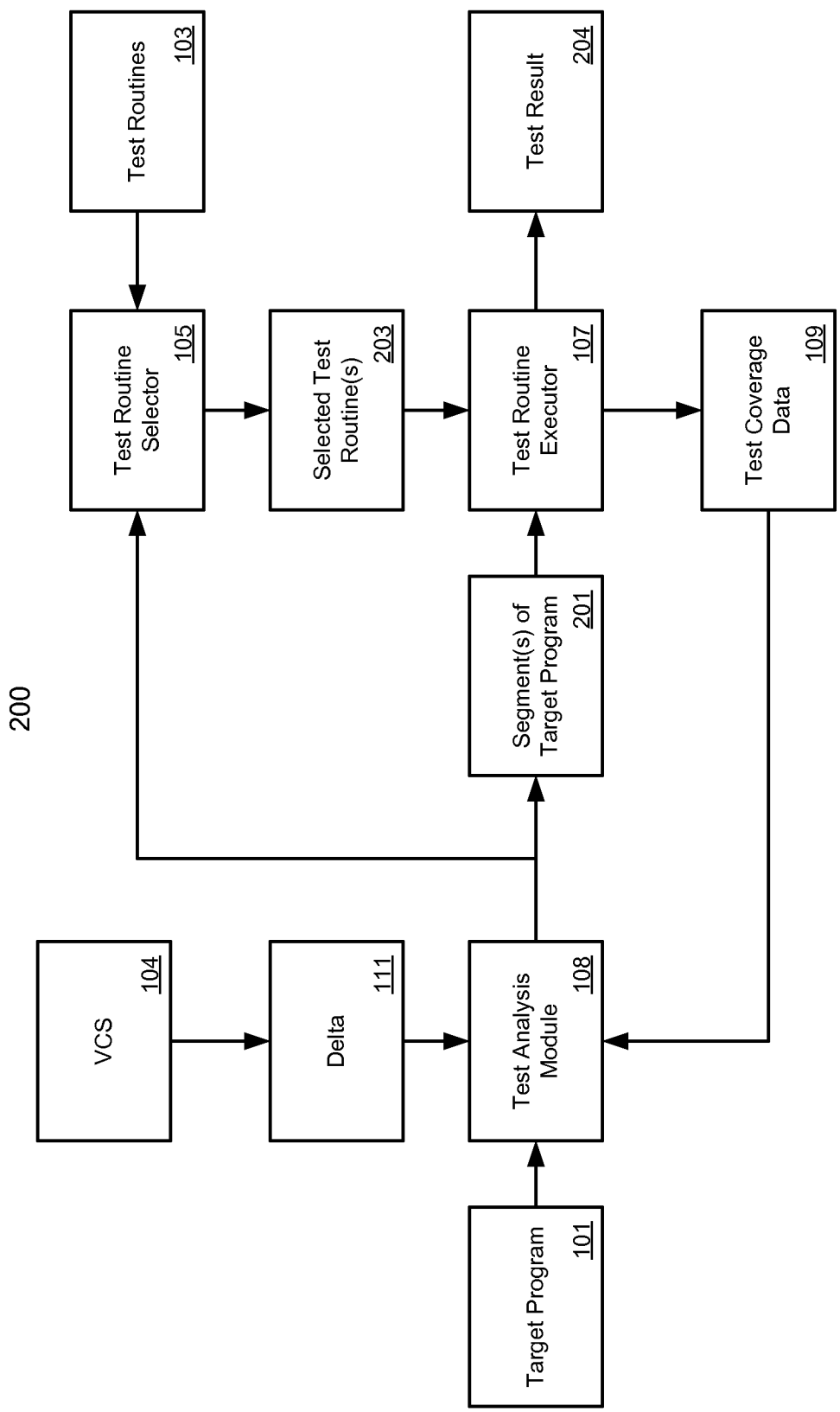
FIG. 2 is a process flow illustrating a process for identifying lines of code to be tested and selecting an appropriate test routing for testing according to one embodiment of the invention.

FIG. 2 is a process flow illustrating a process for identifying lines of code to be tested and selecting an appropriate test routine for testing according to one embodiment of the invention. Process flow 200 can be performed by test framework 102 of FIG. 1. Referring to FIG. 2, target program 101 is analyzed by test analysis module 108 in view of delta 111 retrieved from VCS system 104. Delta 111 represents a code difference between a current version of the target program and a previous version of the target program that has been previously tested by test routines 103. Based on delta 111 and target program 101, test analysis module 108 can identify segments of target program 201 that have been previously tested and segments that have not been previously tested in view of test coverage data 109 of a previous test. The lines of code that have not been previously tested (that need to be tested) may include new lines of code that were not present in the previous version of the target program, previously existing lines of code that have been modified and/or unmodified previously existing lines of code that were not tested. Test coverage data 109 includes information identifying the lines of code that have been covered (tested) during the previous test of a particular test routine. Test routines 103 can then be run on those segments that have not been previously tested without having to rerun the same test routines 103 on all of the segments that have been previously tested.

FIG. 3A is an example of a delta retrieved from a VCS system. Referring to FIG. 3A, delta 300 may be generated by issuing a "diff" command 301 to the VCS system. Note that delta 300 can represent any code written in any kind of programming languages such as C/C++, Java, etc. The VCS system can also be any kind of VCS system. The format of delta 300 can be different for different programming languages and/or different VCS systems. In this example, the VCS system is a GIT compatible VCS system. GIT is a version control system designed to handle large projects with speed and efficiency; it is used for many open source projects, most notably the Linux kernel. GIT falls in the category of distributed source code management tools. Every GIT working directory is a full-fledged repository with full revision tracking capabilities, not dependent on network access or a central server.

Referring back to FIGS. 2 and 3A, delta 300 is analyzed by analysis module 108 to identify lines of code of target program 101 that have been covered by delta 300, which is shown in FIG. 3B as an example. Referring to FIG. 3B, information 350 extracted from delta 300 includes a filename 351 and line numbers 352 identifying the lines of code covered by delta 300.

FIG. 4 is an example of test coverage data of a test routine according to one embodiment. Referring to FIG. 4, test coverage data 400 includes test routine identifier (ID) 401 identifying a test routine that performed the test and filename 402 identifying a file on which test routine 401 is performed. Test coverage data 400 further includes lines of code 403 of the file having the filename 402 that have been tested during the test.

Test coverage data 400 may be generated or logged during a previous test by the corresponding test routine.

Based on lines of code 352 from the delta 350 and lines of code 403 from the test coverage data 400, lines of code that have not been tested and lines of code that are unrelated are determined by comparing the lines of code 352 and 403. In this example, lines 591-592 that exist in test coverage data 400 but not in delta 350 have already been tested and are unmodified. Thus these lines of code do not need to be tested again, and are referred to herein as unrelated lines of code. Lines 554-557 that exist in delta 350, but not in test coverage data 400 are those that are untested, since lines 554-557 may not be in the previous version of the target program. Additionally, lines 558-583 that are in both delta 350 and test coverage data 400 reflect those lines of code that were previously tested and that have since been modified. Finally, lines of code that are in neither the delta 350 nor the test coverage data 400 were not tested by the associated testing routine and have not been modified.

Referring back to FIG. 2, based on segments of the target program 201, which identify the lines of code that have not been tested and/or that need to be retested, test routine executor 107 can run the selected test routine 203, which is associated with the test coverage data that identifies the untested lines of code, on the untested lines of code without having to retest all the lines of code, particularly those that have been previously tested. As a result, test result 204 can be generated quickly. In addition, new test coverage data is also generated for subsequent usage.

According to another embodiment, test routines 103 may be ranked based on information obtained from delta 111 and test coverage data 109. As described above, based on delta 111 and test coverage data 109 for each test routine 103, a number of untested lines of code and a number of unrelated lines of code can be determined for each test routine 103. Unrelated lines of code are lines that are in the test but have not been changed. Each test routine 103 can then be ranked based on the number of untested lines of code and the number of unrelated lines of code. A test routine having a highest ranking will be executed first in order to quickly assess the code stability of the target program.

In one embodiment, for each test routine 103, a score is computed based on the number of untested lines of code and number of unrelated lines of code. In one embodiment, a score is computed based on a first ratio between the number of untested lines of code and the total lines of code covered by delta 111 and a second ratio between the number of unrelated lines of code and the total lines of code covered by delta 111. Referring back to FIGS. 3A-3B and 4, in this example, the number of untested lines of code is 4 (e.g., lines 554-557 of FIG. 3B) while the number of unrelated lines of code is 2 (e.g., lines 591-592 of FIG. 4). Thus, the first and second ratios for the test routine associated with test coverage data 400 of FIG. 4 can be determined as 0.15 (4 divided by 26) and 0.077 (2 divided by 26), respectively. The score representing this test routine will be <0.15, 0.077>.

According to one embodiment, test routines 103 are then ranked or sorted based on the first ratio and then by the second ratio. For purposes of illustration, it is assumed that there are three test routines: [<0.2, 0.4>, <0.2, 0.2>, <0.1, 0.8>]. After the ranking, these three test routines are sorted in an order based on the first ratio and then by the second ratio as [<0.1, 0.8>, <0.2, 0.2>, <0.2, 0.4>]. Thereafter, the test routine associated with the ranking of <0.1, 0.8> is executed first.

Figure 5:
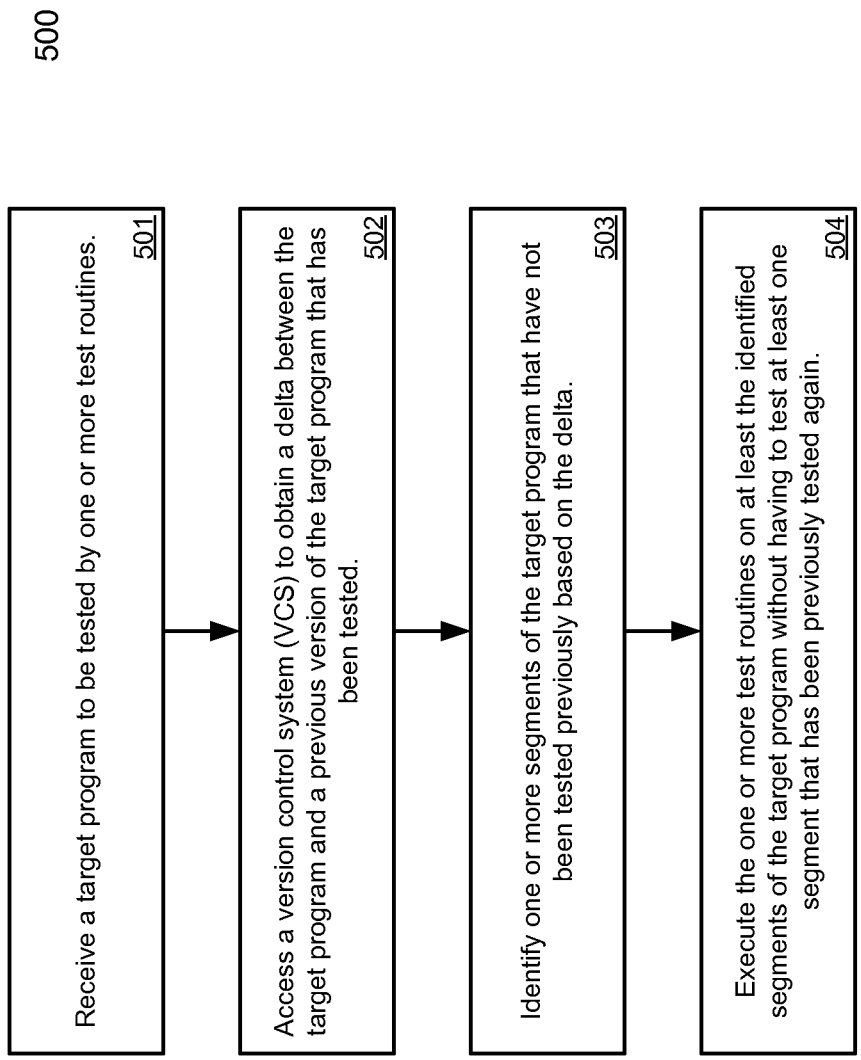
FIG. 5 is a flow diagram illustrating a method for efficiently testing programs according to one embodiment of the invention.

FIG. 5 is a flow diagram illustrating a method for efficiently testing programs according to one embodiment of the invention. Method 500 may be performed by test framework 102 of FIG. 1. Referring to FIG. 5, at block 501, a target program is received to be tested by one or more test routines. At block 502, processing logic accesses a VCS system to obtain a delta between the target program (e.g., a current version) and a previous version of the target program that has been tested by the test routines. At block 503, one or more segments of the target program are identified that have not been tested previously based on the delta. This may include newly added segments, preexisting segments that were untested and/or modified segments that were previously tested but that need to be retested because they have changed.

In one embodiment, specific lines of code covered by the delta are determined. For each test routine to be applied to the target program, test coverage data for the test routine is retrieved. The test coverage data was recorded or captured during the previous test using the test routine on the previous version of the target program. The test coverage data identifies lines of code that have been tested in the previous test. By comparing the lines of code from the delta and the test coverage data, processing logic can determine, at block 503, which lines of code in the current version have not been previously tested by a particular test routine. At block 504, the one or more test routines are executed on at least the identified segments of the target program that have not been previously tested, without having to retest all of those that have been previously tested.

Figure 6:
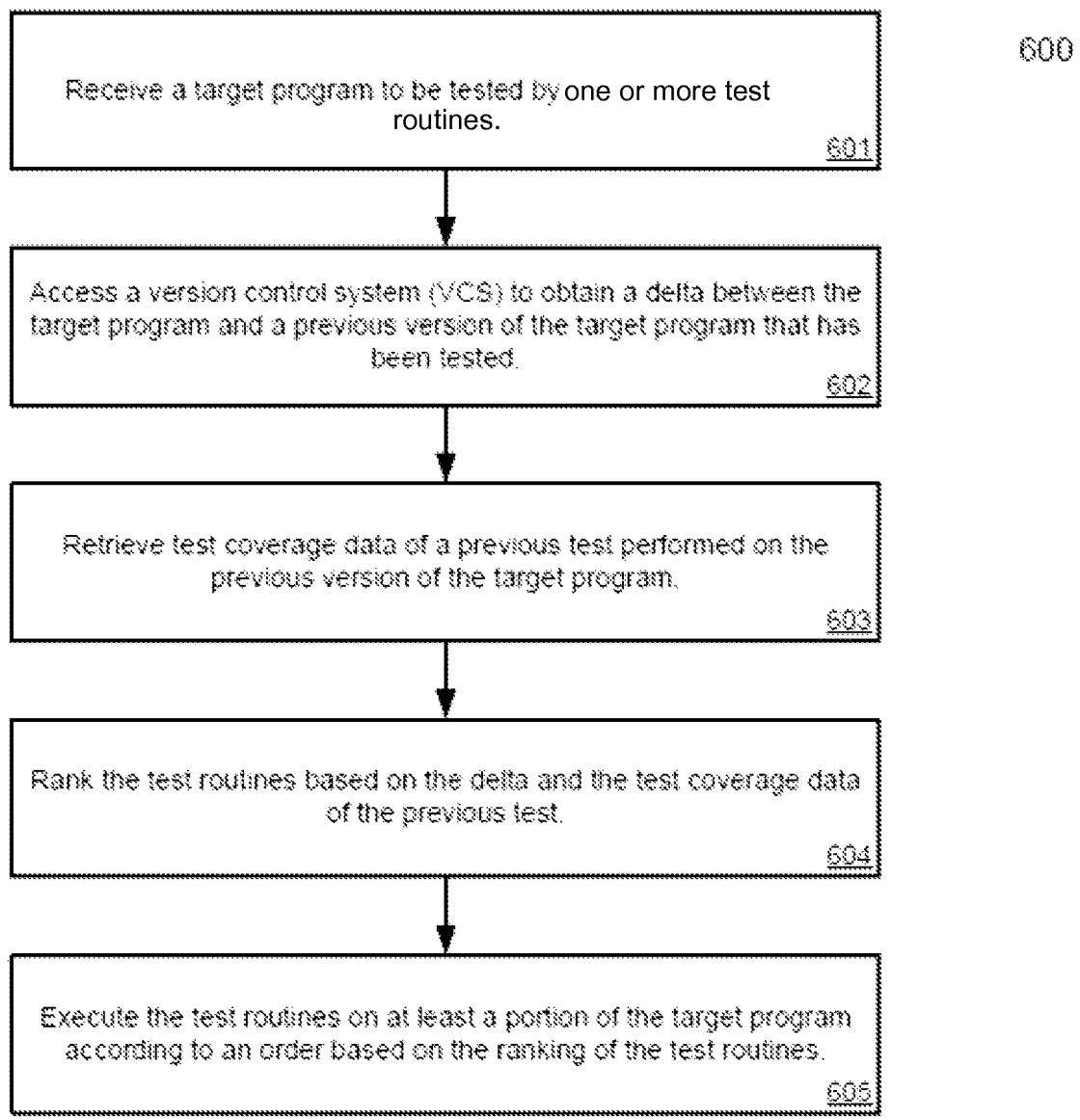
FIG. 6 is a flow diagram illustrating a method for efficiently testing programs according to another embodiment of the invention.

FIG. 6 is a flow diagram illustrating a method for efficiently testing programs according to another embodiment of the invention. Method 600 may be performed by test framework 102 of FIG. 1. Referring to FIG. 6, at block 601, a target program is received to be tested by one or more test routines. At block 602, processing logic accesses a VCS system to obtain a delta between the target program (e.g., a current version) and a previous version of the target program that has been tested by the test routines. At block 603, for each of the test routines, test coverage data is retrieved, where the test coverage data includes information identifying lines of code covered during a previous test by the corresponding test routine. At block 604, the test routines are ranked based on the delta and the test coverage data of the test routines. In one embodiment, the ranking is determined based on the lines of untested code and/or lines of unrelated code that are identified based on the delta and the test coverage data. At block 605, the test routines are executed in an order determined based on the ranking of the test routines.

Figure 7:
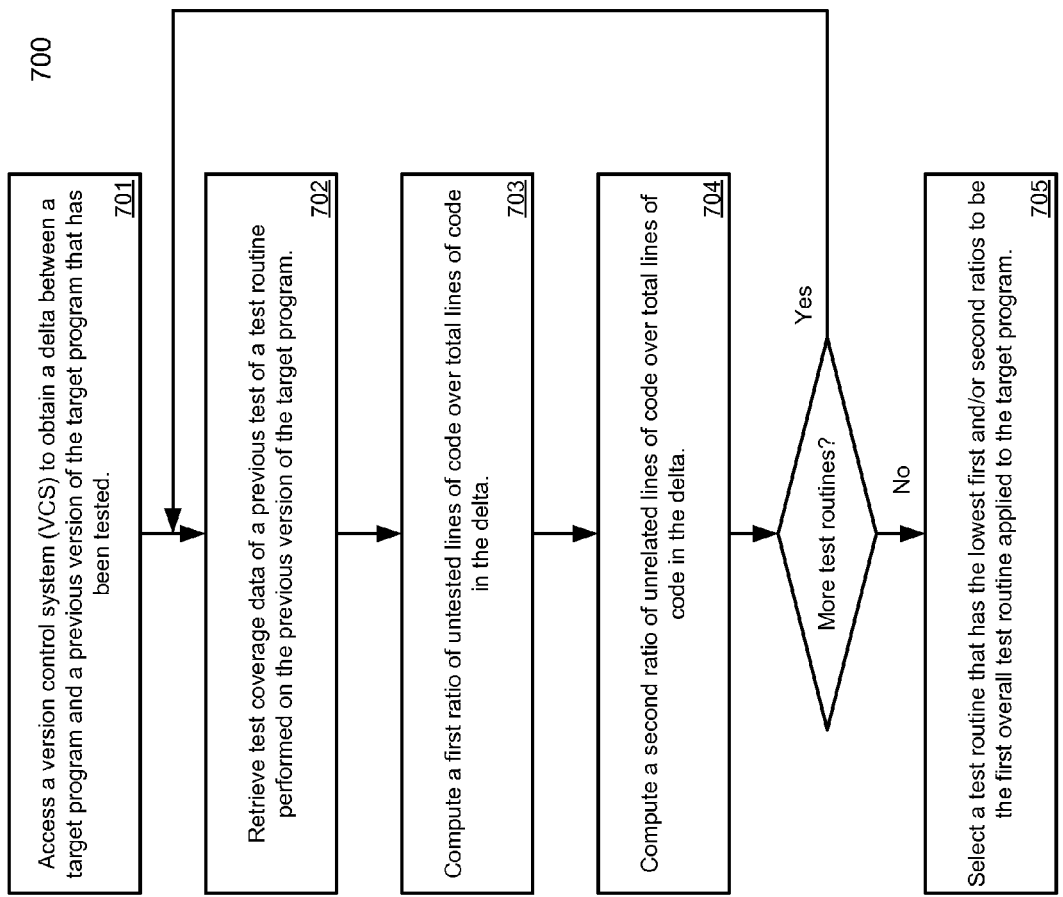
FIG. 7 is a flow diagram illustrating a method for efficiently testing programs according to another embodiment of the invention.

FIG. 7 is a flow diagram illustrating a method for efficiently testing programs according to another embodiment of the invention. Method 700 may be performed by test framework 102 of FIG. 1. Referring to FIG. 7, at block 701, processing logic accesses a VCS system to obtain a delta between a current version of a target program to be tested and a previous version of the target program that has been tested by multiple test routines. At block 702, for each of the test routines, processing logic retrieves test coverage data of a previous test performed on the previous version of the target program by the test routine. At block 703, processing logic computes a first ratio of a number of untested lines of code over a number of lines of code covered by the delta. The untested lines of code can be determined by comparing lines of code in the test coverage data and the delta. For example, the untested lines of code are those that exist in the delta but are not in the test coverage data (i.e., lines of code that have been added since this test was performed). At block 704, processing logic computes a second ratio of unrelated lines of code over the number of lines of code in the delta. In one embodiment, the unrelated lines of code are those existed in the test coverage data but are not in the delta (i.e., lines of code that have been removed since this test was performed). The above operations are repeatedly performed for each of the test routines. At block 705, processing logic selects one of the test routines that have the lowest first ratio and/or second ratio to be the first overall test routine for testing the target program in order to quickly assess code stability of the target program.

Figure 8:
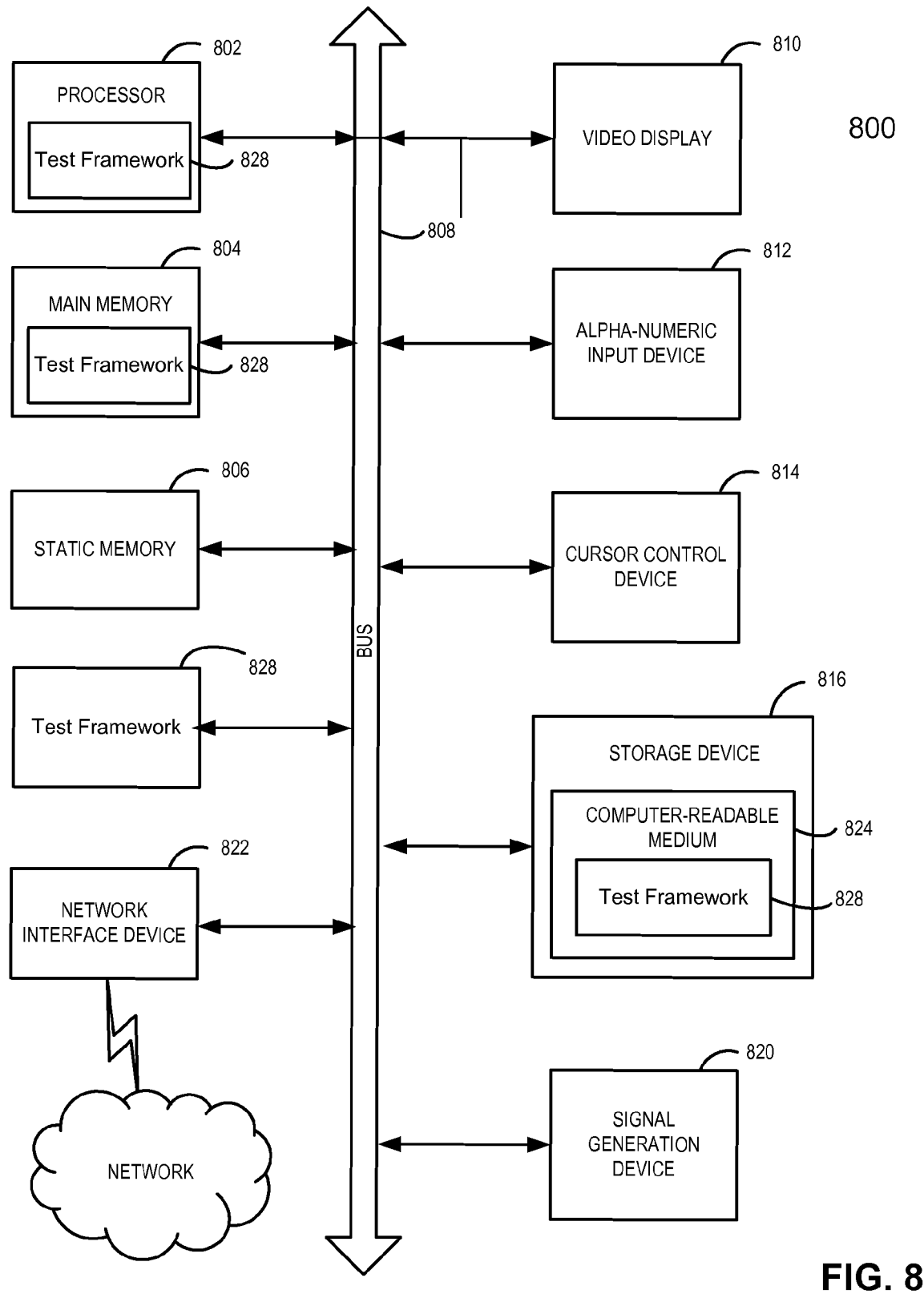
FIG. 8 illustrates a data processing system which may be used with an embodiment of the invention.

FIG. 8 illustrates a data processing system which may be used with an embodiment of the invention. For example, system 800 may represent system 100 of FIG. 1. Referring to FIG. 8, system 800 may present a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processors such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processing device 802 is configured to execute the instructions 828 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a non-transitory computer-readable storage medium 824 (also known as a non-transitory machine-readable storage medium or a non-transitory computer-accessible medium) on which is stored one or more sets of instructions or software (e.g., test framework 828) embodying any one or more of the methodologies or functions described herein. The module 828 may also reside, completely or at least partially, within the main memory 804 and/or within the processing device 802 during execution thereof by the computer system 800, the main memory 804 and the processing device 802 also constituting non-transitory computer-readable storage media.

While the non-transitory computer-readable storage medium 824 is shown in an exemplary embodiment to be a single medium, the term "non-transitory computer-readable storage medium" should be taken to include a single medium or multiple media (e.g., a centralized or distributed database, and/or associated caches and servers) that store the one or more sets of instructions. The terms "non-transitory computer-readable storage medium" shall also be taken to include any medium that is capable of storing or encoding a set of instructions for execution by the machine and that cause the machine to perform any one or more of the methodologies of the present invention. The term "non-transitory computer-readable storage medium" shall accordingly be taken to include, but not be limited to, solid-state memories, and optical and magnetic media.

The test framework 828, components and other features described herein can be implemented as discrete hardware components or integrated in the functionality of hardware components such as ASICS, FPGAs, DSPs or similar devices. In addition, the test framework 828 can be implemented as firmware or functional circuitry within hardware devices. Further, the test framework 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer-readable medium. A non-transitory computer-readable medium includes any mechanism for storing information in a form readable by a machine (e.g., a computer). For example, a non-transitory computer-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
obtaining a delta in source code between a first version of a target program and a second version of the target program, wherein a test comprising a plurality of test routines is executed on at least a portion of the first version;
identifying, by a processing device and in view of the delta, a first portion of the second version that has not been tested in the test of the first version, a second portion of the second version that has been tested in the test of the first version, a third portion of the second version that has been tested in the test of the first version and is not in the delta, and a fourth portion of the second version that has not been tested in the test of the first version and is in the delta; and
executing, by the processing device, multiple ones of the plurality of test routines on at least the first portion of the second version according to an order in view of minimizing a number of lines of code in the third portion that are tested and maximizing a number of lines of code in the fourth portion that are tested and without executing the plurality of test routines on the second portion of the second version.

2. The method of claim 1, further comprising accessing over a network a version control system (VCS) that stores the source code of the target program to obtain the delta between the first version and the second version.

3. The method of claim 1, wherein identifying the first and second portions further comprises examining test coverage data generated from a previous test performed on the first version, wherein the test coverage data comprises information identifying lines of code that have been tested by the previous test.

4. The method of claim 3, further comprising:
identifying first lines of code of the target program that are included in the delta;
identifying second lines of code of the target program that have been tested in view of the test coverage data; and
comparing the first lines and the second lines of code to identify the first and second portions of the target program.

5. The method of claim 1, further comprising generating test coverage data that identifies lines of code covered by the execution of the one or more of the plurality of test routines on the target program.

6. A non-transitory computer readable storage medium including instructions that, when executed by a processing device, cause the processing device to perform operations comprising:
obtaining a delta in source code between a first version of a target program and a second version of the target program, wherein a test comprising a plurality of test routines is executed on at least a portion of the first version;
identifying, by the processing device and in view of the delta, a first portion of the second version that has not been tested in the test of the first version, a second portion of the second version that has been tested in the test of the first version, a third portion of the second version that has been tested in the test of the first version and is not in the delta, and a fourth portion of the second version that has not been tested in the test of the first version and is in the delta; and
executing, by the processing device, multiple ones of the plurality of test routines on at least the first portion of the second version according to an order in view of minimizing a number of lines of code in the third portion that are tested and maximizing a number of lines of code in the fourth portion that are tested and without executing the plurality of test routines on the second portion of the second version.

7. The non-transitory computer readable storage medium of claim 6, wherein the operations further comprise accessing over a network a version control system (VCS) that stores the source code of the target program to obtain the delta between the first version and the second version.

8. The non-transitory computer readable storage medium of claim 6, wherein identifying the first and second portions further comprises examining test coverage data generated from a previous test performed on the first version, wherein the test coverage data comprises information identifying lines of code that have been tested by the previous test.

9. The non-transitory computer readable storage medium of claim 8, wherein the operations further comprise:
identifying first lines of code of the target program that are included in the delta;
identifying second lines of code of the target program that have been tested in view of the test coverage data; and
comparing the first lines and the second lines of code to identify the first and second portions of the target program.

10. The non-transitory computer readable storage medium of claim 6, wherein the operations further comprise generating test coverage data that identifies lines of code covered by the execution of the one or more of the plurality of test routines on the target program.

11. A system comprising:
a memory to store instructions; and
a processing device, coupled to the memory, to execute the instructions to:
obtain a delta in source code between a first version of a target program and a second version of the target program, wherein a test comprising a plurality of test routines is executed on at least a portion of the first version;
identify, in view of the delta, a first portion of the second version that has not been tested in the test of the first version, a second portion of the second version that has been tested in the test of the first version, a third portion of the second version that has been tested in the test of the first version and is not in the delta, and a fourth portion of the second version that has not been tested in the test of the first version and is in the delta; and execute multiple ones of the plurality of test routines on at least the first portion of the second version according to an order in view of minimizing a number of lines of code in the third portion that are tested and maximizing a number of lines of code in the fourth portion that are tested and without execution of the plurality of test routines on the second portion of the second version.

12. The system of claim 11, wherein the processing device is further to access over a network a version control system (VCS) that stores the source code of the target program to obtain the delta between the first version and the second version.

13. The system of claim 11, wherein the processing device is further to examine test coverage data generated from a previous test performed on the first version, wherein the test coverage data comprises information identifying lines of code that have been tested by the previous test.

14. The system of claim 13, wherein the processing device is further to:
identify first lines of code of the target program that are included in the delta,
identify second lines of code of the target program that have been tested in view of the test coverage data, and
compare the first lines and the second lines of code to identify the first and second portions of the target program.

15. The system of claim 11, wherein the processing device is further to generate test coverage data that identifies lines of code covered by the execution of the one or more of the plurality of test routines on the target program.

* * * * *